US007264127B2

(12) United States Patent
Jones

(10) Patent No.: US 7,264,127 B2
(45) Date of Patent: Sep. 4, 2007

(54) SEWN CLOTH BAGS FOR STORING KITCHEN LIDS

(76) Inventor: Ronald Westerman Jones, 13206 Bridgefield Pl., Wichita, KS (US) 67230

( * ) Notice: Subject to any disclaimer, the term of this patent is extended or adjusted under 35 U.S.C. 154(b) by 342 days.

(21) Appl. No.: 10/358,180

(22) Filed: Feb. 5, 2003

(65) Prior Publication Data

US 2003/0164345 A1    Sep. 4, 2003

(51) Int. Cl.
A47F 7/08 (2006.01)
B65D 85/00 (2006.01)
B65D 85/44 (2006.01)

(52) U.S. Cl. ............................ 211/118; 211/34; 211/38; 206/320

(58) Field of Classification Search ............... 211/118, 211/85.4, 94.02, 34, 113, 13.1, 13, 41.11, 211/94, 38, 87.01, 89.01, 55, 124, 162, 133, 211/41.6, 41.2, 41.1, 45, 119.004, 90.01, 211/90.04, 94.01; 248/74.3, 298, 110, 229.12, 248/317, 340, 682; 383/39, 7, 9, 38; 190/107; 206/279, 320; 40/491, 611.07, 611.06
See application file for complete search history.

(56) References Cited

U.S. PATENT DOCUMENTS

| 821,986 | A | * | 5/1906 | Coburn ..................... 383/41 |
|---|---|---|---|---|
| 1,521,897 | A | * | 1/1925 | Martin ........................ 383/20 |
| 1,563,902 | A | * | 12/1925 | Grodnick ..................... 220/6 |
| 2,420,456 | A | * | 5/1947 | White ........................ 429/140 |
| 2,507,842 | A | * | 5/1950 | Waddill ..................... 224/560 |
| 2,704,098 | A | * | 3/1955 | Pocock ........................ 383/23 |
| 2,710,638 | A | * | 6/1955 | Ford ............................ 383/23 |
| 2,813,602 | A | * | 11/1957 | MacArthur, Jr. ............. 224/220 |
| 2,832,389 | A | * | 4/1958 | Smith ............................ 383/9 |
| 3,063,570 | A | * | 11/1962 | Kroner ...................... 211/113 |
| 3,282,621 | A | * | 11/1966 | Peterson .................... 294/68.3 |
| 3,834,497 | A | * | 9/1974 | Furst .......................... 190/109 |
| 3,967,666 | A | * | 7/1976 | Farrar .......................... 383/7 |
| 4,047,650 | A | * | 9/1977 | Domingos ................... 224/223 |
| 4,585,127 | A | * | 4/1986 | Benedict ...................... 211/34 |
| D291,754 | S | * | 9/1987 | Griswold ..................... D6/553 |
| 4,724,791 | A | * | 2/1988 | McSorley .................... 114/343 |
| 4,760,920 | A | * | 8/1988 | Thomsen .................... 206/495 |
| 4,773,585 | A | * | 9/1988 | Lehrman ................... 232/1 B |
| D300,399 | S | * | 3/1989 | Krugman ..................... D6/553 |
| 4,887,700 | A | * | 12/1989 | Rice .......................... 190/111 |
| 4,930,635 | A | * | 6/1990 | Hotchkiss et al. .......... 206/495 |
| 4,947,987 | A | * | 8/1990 | Keenan ...................... 206/292 |
| 4,967,913 | A | * | 11/1990 | Bayer ......................... 211/38 |
| 5,025,918 | A | * | 6/1991 | Bergeron .................... 206/750 |
| 5,121,833 | A | * | 6/1992 | Lindsay et al. .............. 206/6.1 |
| 5,125,519 | A | * | 6/1992 | Cambria ..................... 211/118 |
| 5,141,113 | A | * | 8/1992 | Elliott ....................... 211/85.2 |

(Continued)

*Primary Examiner*—Gregory J. Strimbu
*Assistant Examiner*—Colleen M. Quinn

(57) ABSTRACT

A kitchen lid storage sack fabricated from a series of fabric panels each folded back upon itself in a U-shape forming a plurality of open mouth pockets, a rigid tube positioned in a pocket across the top of the sack providing a sliding support for the sack positioned between two adjacent surfaces, such as in the dead space between a cabinet and the side of a refrigerator. The sack is being supported by a stationary bar attached to one of the adjacent surfaces restricting the space between the adjacent surfaces thereby permitting the sack to be freely moved horizontally in and out from between the adjacent surfaces for removal and insertion of pot lids in the plurality of pockets.

5 Claims, 2 Drawing Sheets

U.S. PATENT DOCUMENTS

| | | | |
|---|---|---|---|
| 5,209,344 A * | 5/1993 | Smith | 206/6.1 |
| 5,295,587 A * | 3/1994 | Downes et al. | 211/85.2 |
| 5,377,833 A * | 1/1995 | Ranger | 206/430 |
| 5,387,037 A * | 2/1995 | Daitch | 383/7 |
| 5,427,230 A * | 6/1995 | Mattox | 206/6.1 |
| 5,533,534 A * | 7/1996 | Cariello et al. | 132/286 |
| 5,692,608 A * | 12/1997 | Simien | 206/320 |
| 5,779,033 A * | 7/1998 | Roegner | 206/6.1 |
| 6,481,585 B1 * | 11/2002 | Cloughton | 211/89.01 |
| D487,635 S * | 3/2004 | Collins | D3/315 |
| 6,837,385 B2 * | 1/2005 | Bennett et al. | 211/118 |
| 2002/0030028 A1 * | 3/2002 | Isserstedt | 211/113 |
| 2003/0221978 A1 * | 12/2003 | Redzisz | 206/278 |

* cited by examiner

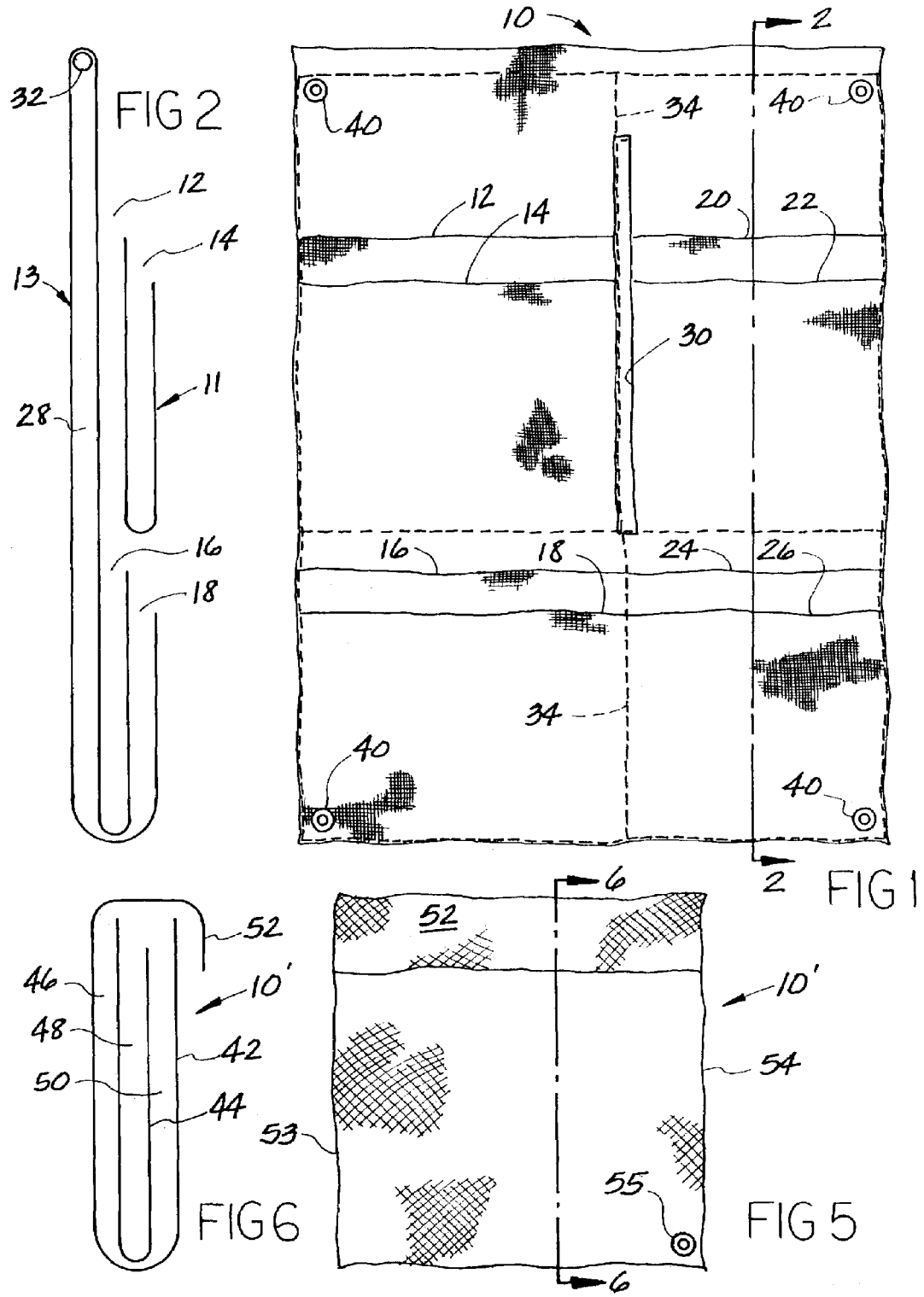

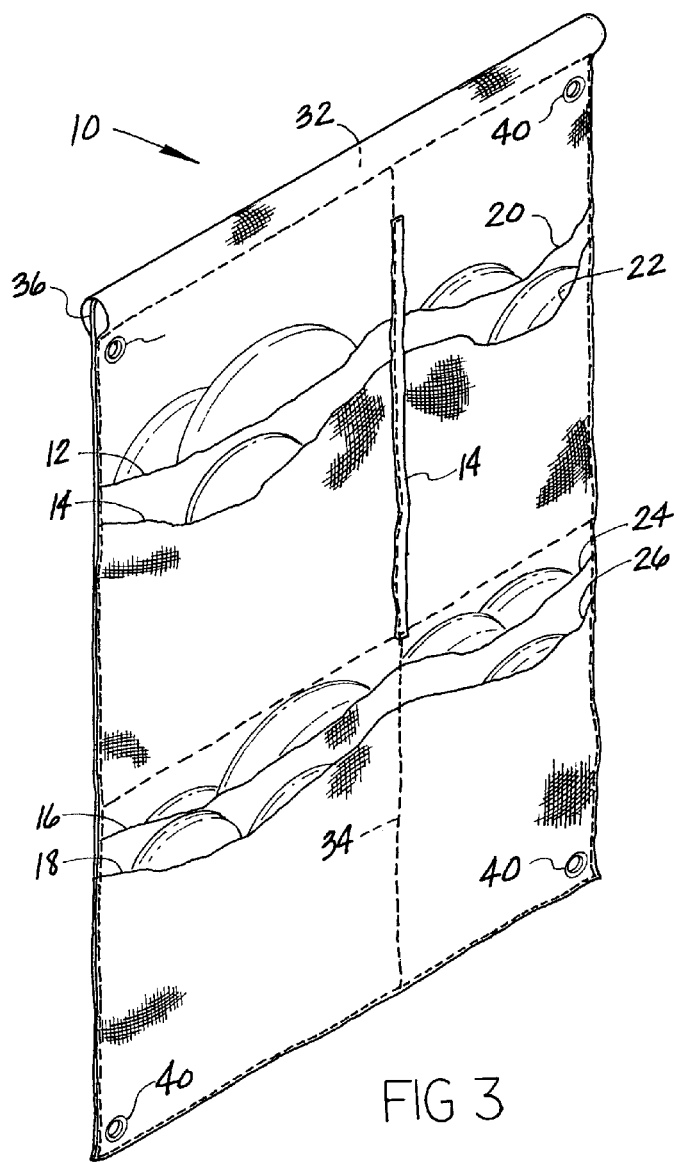
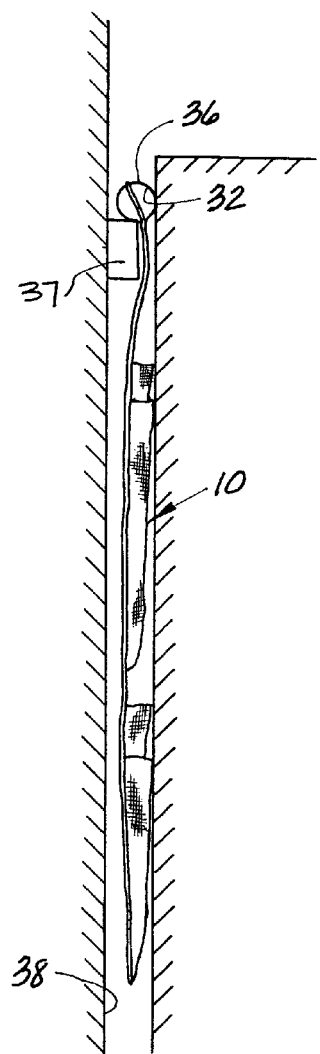
FIG 3
FIG 4

SEWN CLOTH BAGS FOR STORING KITCHEN LIDS

BACKGROUND OF THE INVENTION

Cooking pot lids are typically stored on hooks or rigid racks such as typified in U.S. Pat. No. 5,207,334. The concept of a soft fabric sack providing separate pockets for each lid so as not to cause scratching does not appear to have ever been utilized.

SUMMARY OF THE INVENTION

The pot lid storage sack of the present invention provides a fabric sack having multiple separate pockets for receipt and separation of eight or more pot lids in a soft fabric sack which can be stored in the dead space between the kitchen wall and the refrigerator which sack can be slid outward from between the wall and the refrigerator for removal and insertion of a pot lid in one of a plurality of pockets. The lid storage sack also discloses a closure flap on the bottom of the sack which retains the lids within the sack.

DESCRIPTION OF THE DRAWINGS

FIG. 1 is a plan view of the lid sack;
FIG. 2 is a sectional view taken along lines 2-2 of FIG. 1;
FIG. 3 is a perspective view of the filled lid sack;
FIG. 4 is a perspective view of the filled lid sack positioned between the kitchen wall and the refrigerator;
FIG. 5 is a plan view of a modified form of the lid sack;
FIG. 6 is a sectional view taken along line 6-6 of FIG. 5; and

DETAILED DESCRIPTION OF THE PREFERRED EMBODIMENT

FIG. 1 illustrates the lid sack of the present invention, which is generally referred to as reference number 10. FIG. 2 is a sectional view taken along lines 2-2 of FIG. 1 showing the folded fabric panels before they are stitched. The sack 10 comprises two separate panels 11 and 13 that are folded back upon themselves so as to provide nine separate pockets 12, 14, 16, 18, 20, 22, 24, 26, and 28, which are best seen in FIGS. 1 and 2. Pockets 12, 14, 16, 18, 20, 22, 24, and 26 are all open-topped as best seen in FIG. 2, while pocket 28 has a vertical access opening 30 as shown in FIG. 1. Fabric panel 11 is folded back against itself once while fabric panel 13 is folded back against itself three times as viewed in FIG. 2. Stitched seam 34 as shown in FIG. 1 separates the four pockets on the right from the four pockets on the left as seen in FIG. 1. Pockets 20 and 22 provide a more narrow spacing for smaller pot lids while pockets 12 and 14 have a greater width for a medium size lid while pocket 28, the largest pocket, provides a space for an even larger pot lid. Located across the top of the lid sack 10 is a horizontally positioned pocket 36 into which is sewn a plastic tube 32 which provides the mounting means for the lid sack 10.

In FIG. 4, the dead space 38 between the refrigerator and its adjacent wall provides the storage space for the lid sack 10 when it is not in use. Attached to the adjacent wall is a bar 37 which supports the lid sack 10. The restricted space between bar 37 and the side of the refrigerator is less than the diameter of the plastic tube 32, therefore, the lid sack is held in its suspended position as shown in FIG. 4. Manually gripping the tube 32 and pulling it, as also shown in FIG. 3, provides a support structure for hanging the lid sack 10 in its stored position while allowing it to be pulled horizontally outward to remove or insert pot lids in any of the various pockets. Bar 37 could be a 2×4 or any other horizontally positioned member just so long as it is spaced between the refrigerator wall and the bar 15 is less than the plastic tube 32's diameter. The lid sack 10 can be pulled partially out while it is still retained in its hanging position or completely out if desired.

The lid sack 10 can also be mounted on a pair of pins, not shown, through grommets 40 located at the upper corners of the lid sack.

The lid sack could also be stored in another manner such as folding the sack between the pockets and placing them in a drawer.

A modified form of lid sack 10' is illustrated in FIGS. 5 and 6. FIG. 5 illustrates a plan view of the sack 10' while FIG. 6 illustrates a sectional view taken along lines 6-6 of FIG. 5 before the stitching of the sack. Sack 10' includes two fabric panels 42, and 44, which are folded back against themselves to form pockets 46, 48, and 50 for receipt of plastic lids. Each of the pockets 46, 48, and 50 have open ends as shown in FIG. 6, all of which are enclosed by a flap 52, which is a portion of panel 42 folded back against itself a third time. Flap 52 is stitched along its sides 53 and 54, 50 as to restrict the openings of the various pockets under hanging conditions. Overhanging flap 52 prevents the lids within the sack from falling out when the lid is hung by grommet 52 as shown in FIG. 5. Flap 52 retains the lids within the sack, but they are very easy to manually remove once the flap is pulled back and the sides of the sack are pulled inwards. This retention feature avoids the necessity of some type of fastener to retain the pockets in a closed position and provides a very quick way to access the interior of the sack 10.

I claim:

1. A pot lid storage sack having a length, a width, and top and bottom edges comprising: a series of fabric panels each of the fabric panels folded back upon itself in a U-shape forming a plurality of open-top pockets, one in front of the other a rigid object having a length approximate the width of said sack; a horizontal pocket along the top edge of the sack for receipt of said rigid object comprising a sliding support for said sack; a stationary horizontal bar for attaching to one of two adjacent surfaces said bar supporting said rigid object once inserted into the said horizontal pocket of said sack in a lengthwise and superior position whereby the sack is free to slide horizontally relative to said bar thus facilitating the removal and insertion of pot lids in the plurality of pockets.

2. A pot lid storage sack as set forth in claim 1 including a vertical slot in the center of the storage sack, through one of said fabric panels of the sack forming an additional opening to one of said pockets.

3. A pot lid storage sack as set forth in claim 1 wherein the rigid object comprises a tube which provides lateral rigidity to the sack and a horizontally sliding relationship exist between said tube and the stationary horizontal bar for access and removal of pot lids.

4. A pot lid storage sack as set forth in claim 1 wherein the fabric panels of the sack are folded back at least three times.

5. A pot lid storage sack as set forth in claim 1 wherein the fabric panels of the sack are folded back at least three times and a vertical seam is sewn between the top and bottom edges of the fabric panels thereby doubling the number of pockets in the sack created by the initial folding of the fabric panels.

* * * * *